United States Patent
Yokoyama et al.

(10) Patent No.: US 6,466,708 B2
(45) Date of Patent: Oct. 15, 2002

(54) OPTICAL MODULE AND MANUFACTURING METHOD THEREOF

(75) Inventors: Mitsuru Yokoyama, Takatsuki (JP); Takuji Hatano, Suita (JP); Kyu Takada, Otsu (JP); Miyuki Teramoto, Takatsuki (JP); Koujirou Sekine, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 112 days.

(21) Appl. No.: 09/745,463

(22) Filed: Dec. 26, 2000

(65) Prior Publication Data

US 2001/0006567 A1 Jul. 5, 2001

(30) Foreign Application Priority Data

Dec. 28, 1999 (JP) .......................................... 11-372192

(51) Int. Cl.[7] .............................. G02B 6/12; G02B 6/10
(52) U.S. Cl. ......................................... 385/14; 385/132
(58) Field of Search ........................ 385/14, 125, 130, 385/132, 37, 131

(56) References Cited

U.S. PATENT DOCUMENTS

| | | | |
|---|---|---|---|
| 4,938,594 A | * | 7/1990 | Pavlath ...................... 356/460 |
| 5,335,240 A | | 8/1994 | Ho et al. |
| 5,351,331 A | * | 9/1994 | Chun et al. ................. 156/158 |
| 5,385,114 A | | 1/1995 | Milstein et al. |
| 5,389,943 A | | 2/1995 | Brommer et al. |
| 5,406,573 A | | 4/1995 | Ozbay et al. |
| 5,453,405 A | * | 9/1995 | Fan et al. ................... 148/100 |
| 5,526,449 A | | 6/1996 | Meade et al. |
| 5,739,796 A | | 4/1998 | Jasper, Jr. et al. |
| 5,740,287 A | | 4/1998 | Scalora et al. |
| 5,784,400 A | | 7/1998 | Joannopoulos et al. |
| 5,973,823 A | | 10/1999 | Koops et al. |
| 5,987,208 A | | 11/1999 | Gruning et al. |
| 5,990,850 A | | 11/1999 | Brown et al. |
| 5,998,298 A | | 12/1999 | Fleming et al. |
| 5,999,308 A | | 12/1999 | Nelson et al. |
| 6,002,522 A | | 12/1999 | Todori et al. |
| 6,028,693 A | | 2/2000 | Fork et al. |
| 6,058,127 A | | 5/2000 | Joannopoulos et al. |
| 6,064,506 A | | 5/2000 | Koops |
| 6,075,915 A | | 6/2000 | Koops et al. |
| 6,200,502 B1 | * | 3/2001 | Paatzsch et al. ............. 205/70 |
| 2001/0019565 A1 | * | 9/2001 | Iwasaki et al. ............... 372/39 |
| 2002/0030442 A1 | * | 3/2002 | Koyama et al. ............. 313/504 |

* cited by examiner

Primary Examiner—Tulsidas Patel
Assistant Examiner—Chandrika Prasad
(74) Attorney, Agent, or Firm—Burns, Doane, Swecker & Mathis, LLP

(57) ABSTRACT

An optical module has a substrate, a waveguide, formed on the substrate, for guiding light, and a photonic crystal portion that has media having different refractive indices arranged in a periodic pattern and that is disposed in a channel of the waveguide on the substrate. Here, the photonic crystal and the substrate are integrally formed. The formation comprises the steps of forming an aluminum film on the top of a conductive substrate, forming a protective film on the aluminum film, removing the protective film from a predetermined area to form a window over the predetermined area, anodizing the aluminum film exposed through the window to form photonic crystals, removing the protective film, cladding the bottom of the substrate and forming a core layer over the cladded bottom.

9 Claims, 9 Drawing Sheets

OPTICAL MODULE AND MANUFACTURING METHOD THEREOF

This application is based on application No. H11-372192 filed in Japan on Dec. 28, 1999, the contents of which are hereby incorporated by reference.

BACKGROUND OF THE INVENTION

1. Field of the Invention

The present invention relates to an optical module employing a photonic crystal for multiplexing and demultiplexing optical signals, and to a method for manufacturing such a module.

2. Description of the Prior Art

In recent years, communications systems using optical fibers for connecting individual households to a communications center (hereinafter, such a system will be referred to as an FTTH (fiber to the home) system) have been becoming popular. An FTTH system requires optical network units equipped with an optical module for multiplexing and demultiplexing optical signals.

For example, to the optical network unit installed in each household is delivered, by way of a single optical fiber, down-link light carrying multichannel video signals and having a wavelength of 1.5 µm and up- and down-link light carrying low-speed digital signals for two-way communication and having a wavelength of 1.3 µm. The optical network unit performs demultiplexing to separate the delivered light into video signals having a wavelength of 1.5 µm and down-link digital signals having a wavelength of 1.3 µm, and performs also multiplexing to mix up-link digital signals from the household with the light so as to send them out.

Conventionally, as an optical module having functions as described above, an optical module employing an optical coupler, as shown in FIG. 1, is used. The optical signals entering it via a terminal 1 is demultiplexed by a filter 3 inserted in a waveguide 2 into light with a wavelength of 1.5 µm and light with a wavelength of 1.3 µm.

The light having a wavelength of 1.5 µm is reflected by the filter 3 and exits via a terminal 4; on the other hand, the light having a wavelength of 1.3 µm is transmitted therethrough and exits via a terminal 5. Another terminal 6 serves as an input terminal for the up-link digital signals having a wavelength of 1.3 µm, and the up-link digital signals fed in via this terminal 6 pass through the filter 3 and travel backward so as to exit via the terminal 1.

An optical module as shown in FIG. 1 is manufactured as follows. First, a waveguide 2 having a desired shape is formed on a substrate 7. Then, by reactive-ion etching (hereinafter, referred to as RIE) or mechanical cutting, a slit 38 is so formed as to have a desired angle relative to the waveguide 2. A filter 3 is inserted in the slit 38 and fixed with adhesive.

The filter 3 is usually formed out of a dielectric multilayer film, and is ideally designed to exhibit 100% reflectance for light having wavelengths of 1.5 µm or longer and 100% transmittance for light having wavelengths less than 1.5 µm.

However, manufacturing an optical module having a structure as described above requires very delicate adjustment when a filter 3 is fitted thereto. This sometimes leads to lower reliability due to, for example, uneven accuracy. Furthermore, because the filter 3 and the waveguide 2 are produced in separate steps, coordination is needed between the progress of the two steps and a larger number of pieces of equipment are needed. This inconveniently leads to higher manufacturing costs.

SUMMARY OF THE INVENTION

An object of the present invention is to provide an optical module high in reliability and low in manufacturing costs, and to provide a method for manufacturing such an optical module.

To achieve the above object, according to one aspect of the present invention, an optical module is provided with: a substrate, a waveguide, formed on the substrate, for guiding light; and a photonic crystal portion that has media having different refractive indices arranged in a periodic pattern and that is disposed in a channel of the waveguide on the substrate, wherein the photonic crystal and the substrate are integrally formed.

According to another aspect of the present invention, a method for manufacturing an optical module is provided with: an aluminum film formation step for forming an aluminum film on a conductive substrate; a protective film formation step for forming a protective film on the aluminum film; an exposure step for exposing the aluminum film by removing the protective film within a predetermined area; an anodization step for forming a photonic crystal formed of a porous material by anodizing the aluminum film within the predetermined area; a removal step for making the photonic crystal project by removing the protective film and the aluminum film; a lower cladding formation step for forming a lower cladding layer on the substrate; a core formation step for forming a core layer on the lower cladding layer; a waveguide formation step for forming a waveguide by patterning the core layer into a predetermined shape; and an upper cladding formation step for forming an upper cladding layer covering the waveguide.

BRIEF DESCRIPTION OF THE DRAWINGS

This and other objects and features of this invention will become clear from the following description, taken in conjunction with the preferred embodiments with reference to the accompanied drawings in which:

FIGS. 22A and 22B are diagrams illustrating the anodization step in the method for manufacturing an optical module of the third embodiment.

DESCRIPTION OF THE PREFERRED EMBODIMENTS

Figure 1:
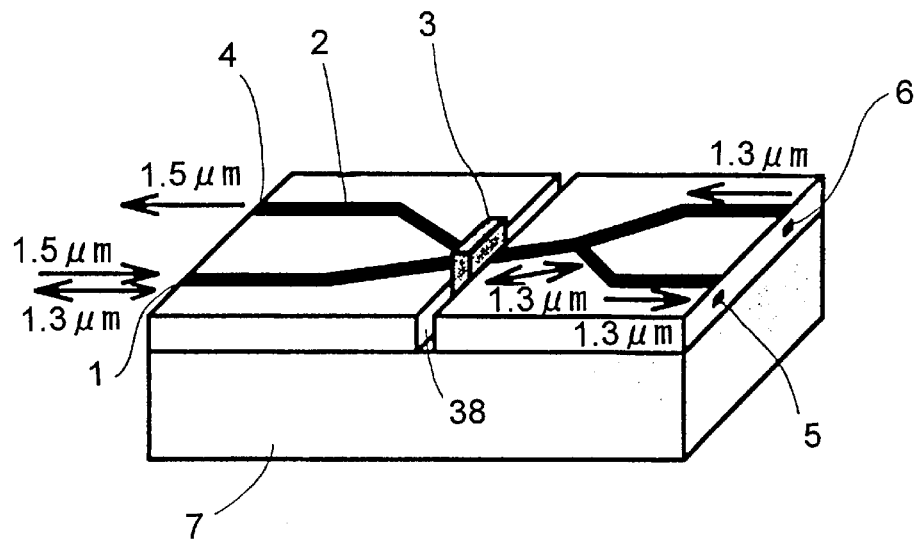
FIG. 1 is a perspective view showing a conventional optical module employing an optical coupler.
Figure 2:
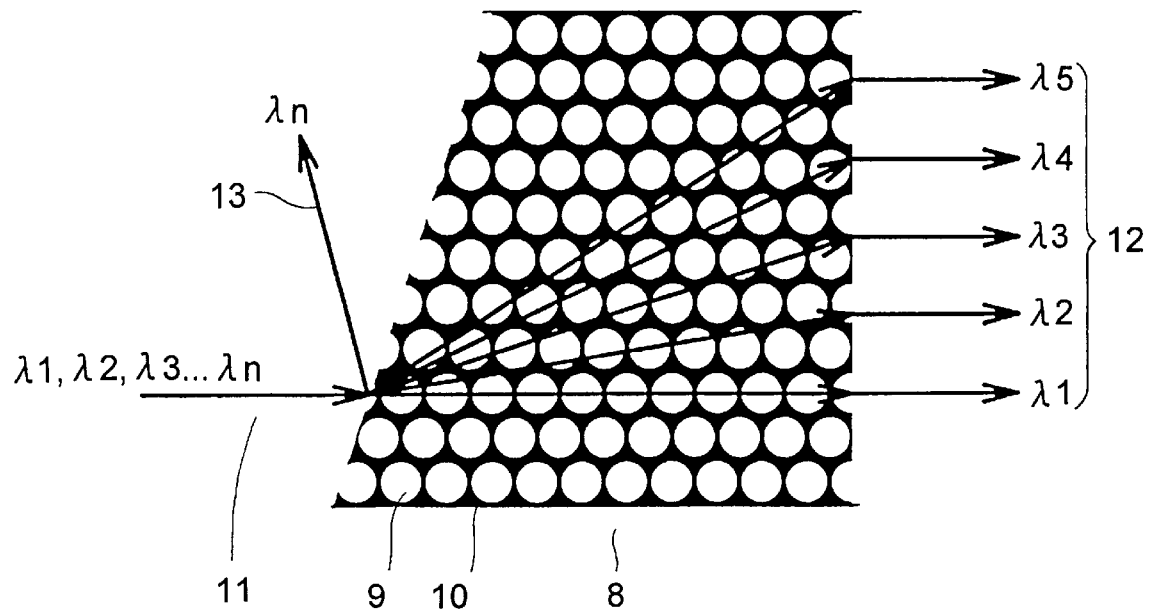
FIG. 2 is a diagram illustrating the properties of a photonic crystal.

Hereinafter, embodiments of the present invention will be described with reference to the drawings. FIG. 2 is a diagram showing a photonic crystal used in the embodiments of the present invention as seen from the direction perpendicular to the direction in which light travels. As shown in FIG. 2, the photonic crystal 8 is a crystal formed by arranging, for example, media 9 and 10 having different refractive indices in a two-dimensional periodic pattern so as to exhibit anisotropically distributed refractive indices.

Because of this property, when multiplex light 11 consisting of components having different wavelength of $\lambda 1$ to $\lambda n$ falls on the photonic crystal 8 from a given direction, some components are propagated therethrough in different directions according to their wavelengths $\lambda 1$ to $\lambda 5$ as indicated by numeral 12, and some components are reflected therefrom without entering it as indicated by numeral 13 (a component having a wavelength of $\lambda n$). By exploiting this property, it is possible to achieve demultiplexing of wavelength-multiplex optical signals with ease.

Figure 3:
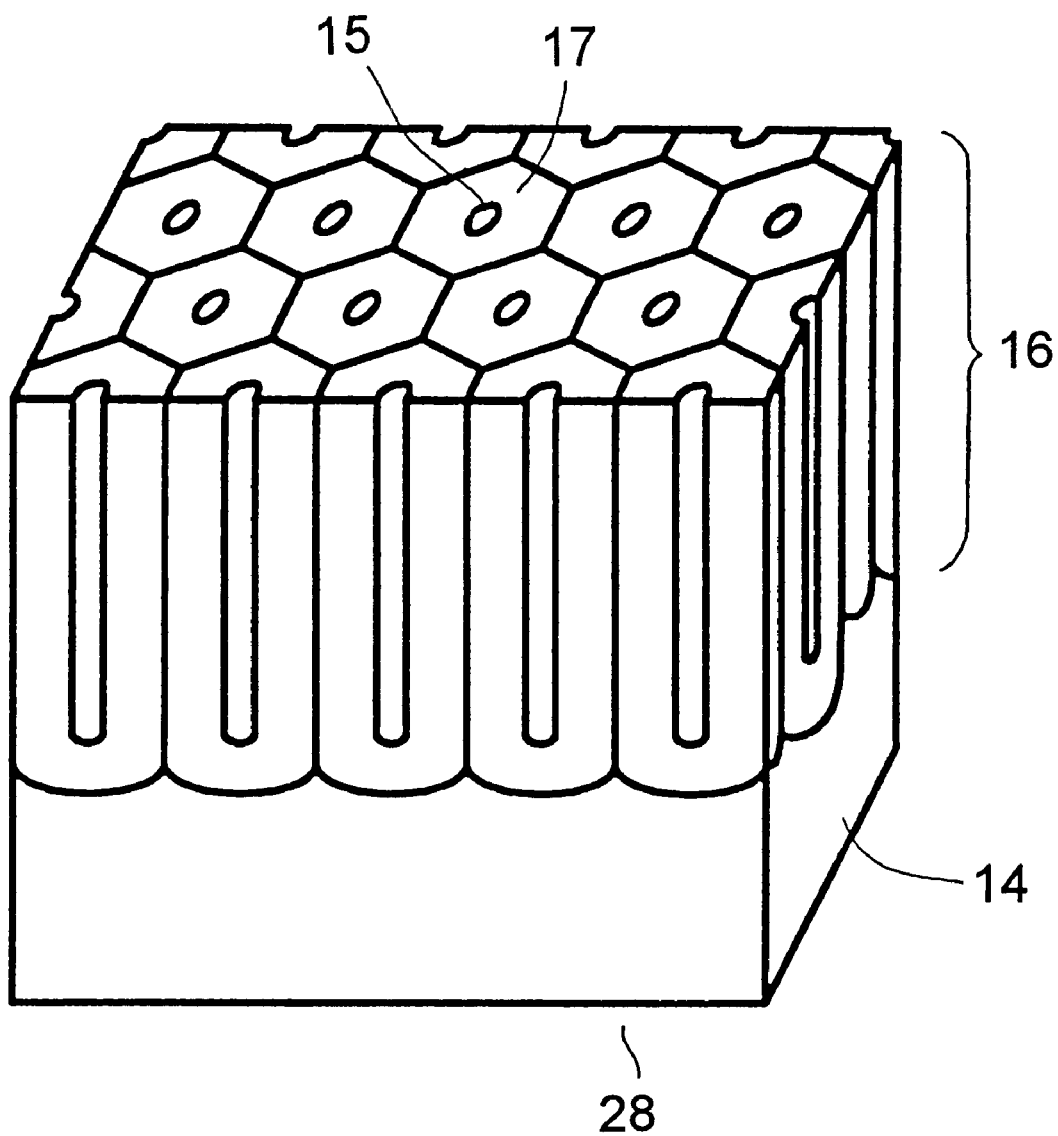
FIG. 3 is a perspective view showing porous alumina obtained through anodization.

Next, a method for manufacturing a photonic crystal will be explained. FIG. 3 is a perspective view showing porous alumina 28 obtained through anodization. When an aluminum substrate 14 is anodized in an acidic electrolytic solution such as an oxalic acid solution, alumina 17 forms in the form of a porous alumina layer 16 having pores 15, i.e. minute holes each several to several hundred nanometers across, arranged regularly in a grid-like structure at intervals of several to several hundred nanometers.

The pores 15 have high verticality and an extremely high aspect ratio. Here, the pores 15 correspond to the medium 9 and the alumina 17 corresponds to the medium 10 shown in FIG. 2. Thus, a two-dimensional periodical structure having media of different refractive indices is obtained, which acts as a photonic crystal.

The diameter and interval of the pores 15 are controllable by adjusting the electric current or voltage or by selecting the type or concentration of the electrolytic solution used in anodization. The pores 15 can be controlled with high accuracy in a manner as shown in FIGS. 4A–4C.

Figure 4A:
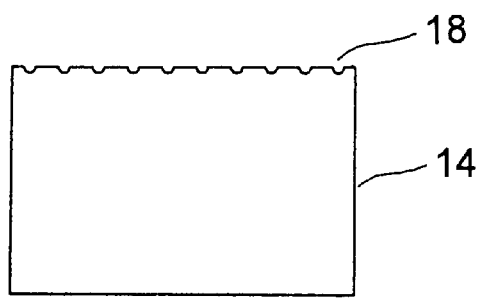
FIGS. 4A–4C are diagrams illustrating the pit formation step and the anodization step in the method for manufacturing an optical module of a first embodiment of the invention.

Specifically, as shown in FIG. 4A, before anodization, on the aluminum substrate 14, pits 18 are formed, as starting points for pore formation, by a micromachining method such as electron beam patterning. The pits 18 are so formed as to permit the pores to be formed with the desired diameter and at desired intervals.

Figure 4B:
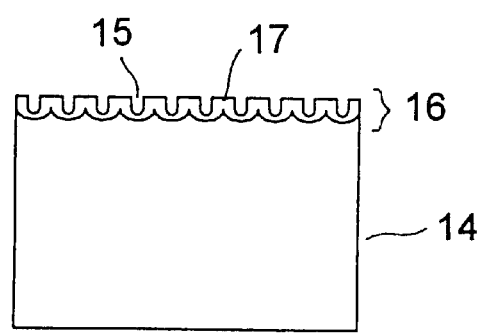
Figure 4C:
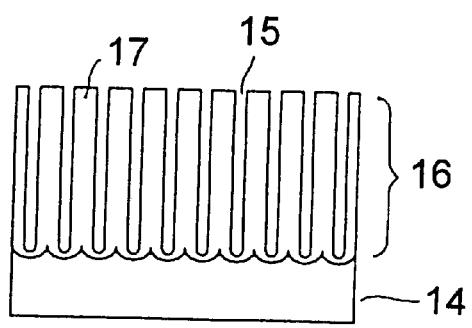

Then, as shown in FIGS. 4B and 4C, as anodization progresses, the pores 15 grow from the pits 18 and thereby form the porous alumina layer 16. The thus formed porous alumina layer 16 has well-controlled orientation and periodicity, and this makes it possible to obtain desired properties in multiplexing and demultiplexing.

Figure 5A:
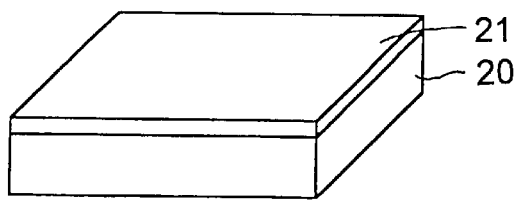
FIGS. 5A and 5B are diagrams illustrating the step for forming an aluminum film in the method for manufacturing an optical module of the first embodiment.
Figure 5B:
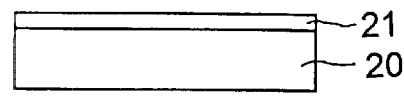

FIGS. 5A, 5B, 6A, 6B, 7A, 7B, 8A, 8B, 9A, 9B, 10A, 10B, 11A, and 11B show the method for manufacturing an optical module of a first embodiment of the invention. Of these figures, FIGS. 5A, 6A, 7A, 8A, 9A, 10A, and 11A are perspective views, and FIGS. 5B, 6B, 7B, 8B, 9B, 10B, and 11B are sectional views. In an aluminum film formation step, as shown in FIGS. 5A and 5B, on a conductive substrate 20 such as one made of low-resistance silicon, an aluminum thin film 21 is formed by sputtering or vacuum deposition.

Figure 9A:
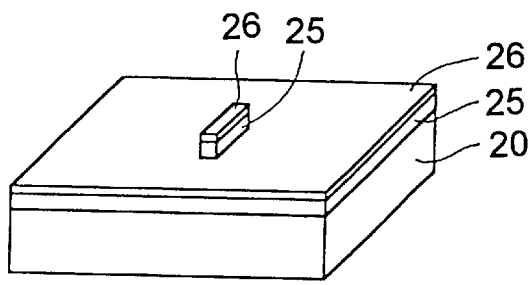
FIGS. 9A and 9B are diagrams illustrating the steps for forming a lower cladding and a core in the method for manufacturing an optical module of the first embodiment.
Figure 9B:
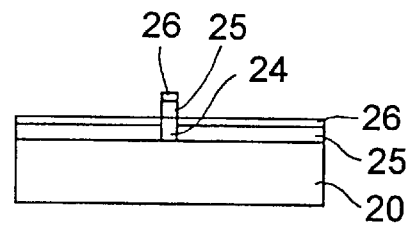

The thickness of the aluminum thin film 21 is made to be equal to the total thickness of a lower cladding layer 25 and a core layer 26, both described latter (see FIGS. 9A and 9B). The reason for using the conductive substrate 20 is that, in anodization, the conductive substrate 20 can be used as an electrode that provides secure electrical contact with the aluminum thin film 21.

Figure 6A:
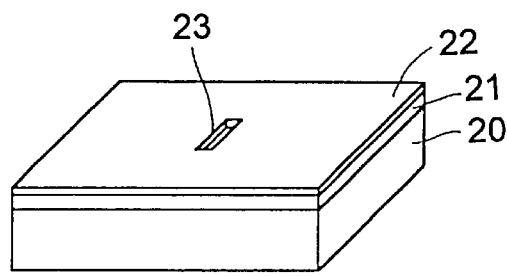
FIGS. 6A and 6B are diagrams illustrating the protective film formation step and the exposure step in the method for manufacturing an optical module of the first embodiment.
Figure 6B:
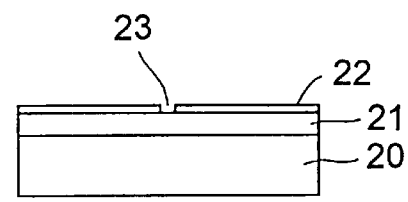

As shown in FIGS. 6A and 6B, in a protective film formation step, a resist 22 is applied to the surface of the aluminum film 21. In the resist 22, a window 23 is formed in an exposure step only where a photonic crystal is to be formed so that the aluminum thin film 21 is exposed there. The resist 22 protects the surface of the aluminum thin film 21 from the acidic electrolytic solution used in anodization.

Figure 7A:
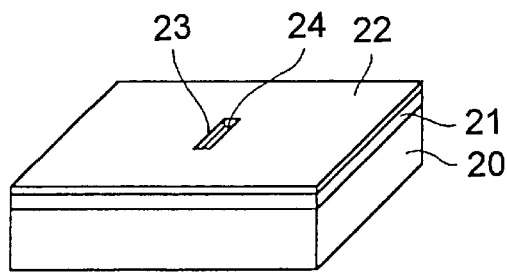
FIGS. 7A and 7B are diagrams illustrating the anodization step in the method for manufacturing an optical module of the first embodiment.
Figure 7B:
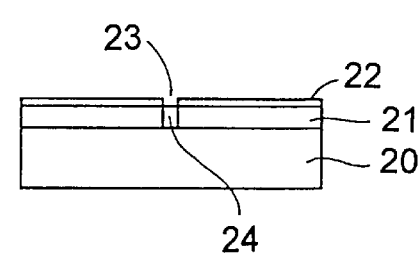

Next, in a pit formation step, pits 18 as shown in FIGS. 4A and 4B described earlier are formed in a predetermined periodic pattern in the surface of the aluminum thin film 21 through the window 23 by a micromachining method such as electron beam patterning. Thereafter, the exposed portion of the aluminum thin film 21 is anodized in an anodization step, so that, as shown in FIGS. 7A and 7B, a photonic crystal 24 formed of porous alumina is formed.

Figure 8A:
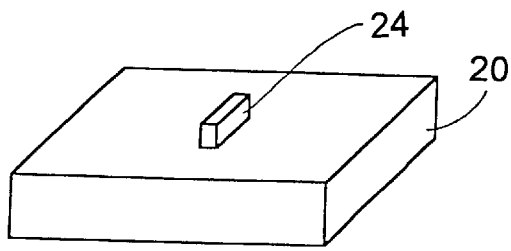
FIGS. 8A and 8B are diagrams illustrating the removal step in the method for manufacturing an optical module of the first embodiment.
Figure 8B:
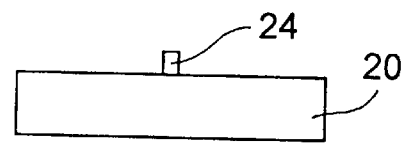

Then, the resist 22 is removed in a removal step, and the aluminum thin film 21 is removed by immersion in a saturated aqueous solution of $HgCl_2$ or saturated methanol solution of $Br_2$, so that only the photonic crystal 24 is left projecting from the conductive substrate 20, as shown in FIGS. 8A and 8B.

In a step for forming a lower cladding, as shown in FIGS. 9A and 9B, a lower cladding layer 25 is formed by depositing fine particles of glass such as quartz by a CVD method or the like. Then, in a core formation step, a core layer 26 having a different refractive index from that of the lower cladding layer 25 is formed in the same manner. In these steps, the lower cladding layer 25 and the core layer 26 are deposited also on top of the photonic crystal 24.

Figure 10A:
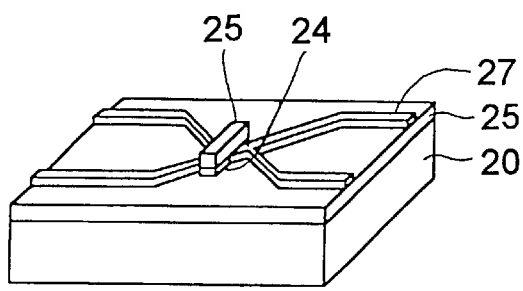
FIGS. 10A and 10B are diagrams illustrating the waveguide formation step in the method for manufacturing an optical module of the first embodiment.
Figure 10B:
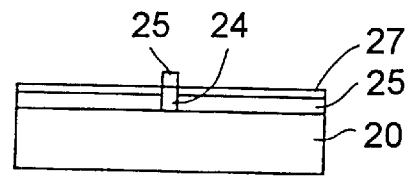
Figure 11A:
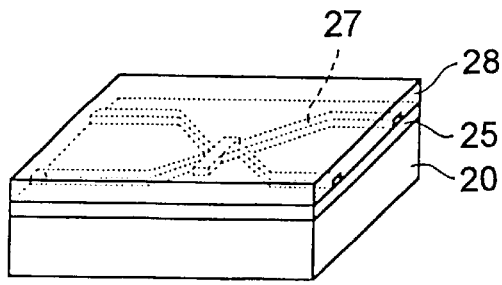
FIGS. 11A and 11B are diagrams illustrating the upper cladding formation step in the method for manufacturing an optical module of the first embodiment.
Figure 11B:
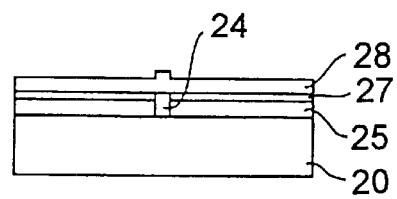

As shown in FIGS. 10A and 10B, in a waveguide formation step, the core layer 26 is patterned into a desired waveguide shape, and then the portion thereof other than is to be formed into an actual waveguide 27 is removed by RIE or the like. Here, the core layer 26 left on top of the photonic crystal 24 is also removed. Then, in a step for forming an upper cladding, as shown in FIGS. 11A and 11B, an upper cladding layer 28 is deposited further on top in the same manner as the lower cladding layer 25, and then unnecessary portions are cut off by dicing or the like. In this way, an optical module is obtained.

The lower cladding layer 25, the core layer 26, and the upper cladding layer 28 may be formed of any other material than quartz, as long as they are so formed that the refractive index of the core layer 26 forming the waveguide 27 is higher than those of the upper and lower cladding layers 25, 28.

In this manufacturing method, when the lower cladding layer 25 is formed in FIGS. 9A and 9B, the glass particles deposited to form the lower cladding layer 25 fill the pores 15 (see FIG. 3) of the photonic crystal 24. Even then, there is a difference in refractive index between the glass particles filling the pores 15 and the alumina 17, and thus the obtained photonic crystal functions properly. However, when it is desirable that the difference in refractive index be made greater by filling the pores 15 with air, a step for laying a masking on the photonic crystal 24 is inserted before depositing the lower cladding layer 25 so that the glass particles are prevented from filing the pores 15.

As shown in FIGS. 10A and 10B, part of the lower cladding layer 25 remains on top of the photonic crystal 24. However, since thereafter the upper cladding layer 28 is formed further on top (FIGS. 11A and 11B), though a small projection is left on the surface, it does not affect the performance of the photonic crystal and the optical module in practical use.

FIGS. 12A, 12B, 13A, 13B, 14A, 14B, 15A, 15B, 16A, 16B, 17A, and 17B show the method for manufacturing an optical module of a second embodiment of the invention. Of these figures, FIGS. 12A, 13A, 14A, 15A, 16A, and 17A are perspective views, and FIGS. 12B, 13B, 14B, 15B, 16B, and 17B are sectional views. This embodiment differs from the first embodiment shown in FIGS. 5A, 5B, 6A, 6B, 7A, 7B, 8A, 8B, 9A, 9B, 10A, 10B, 11A, and 11B only in that an aluminum substrate is used instead of the conductive substrate. This eliminates the need for an aluminum film formation step for forming an aluminum thin film.

Figure 12A:
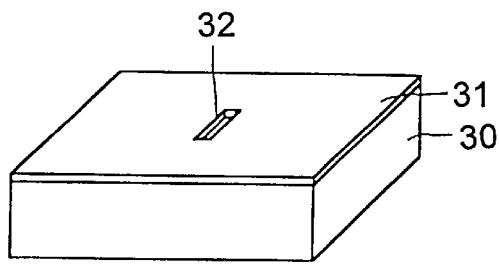
FIGS. 12A and 12B are diagrams illustrating the protective film formation step and the exposure step in the method for manufacturing an optical module of a second embodiment of the invention.
Figure 12B:
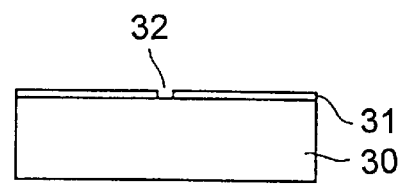

As shown in FIGS. 12A and 12B, in a step for forming a protective film, a resist 31 is applied to the aluminum substrate 30. In the resist 31, a window 32 is formed in an exposure step only where a photonic crystal is to be formed so that the aluminum substrate 30 is exposed there. The resist 31 protects the surface of the aluminum substrate 30 from the acidic electrolytic solution used in anodization.

Figure 13A:
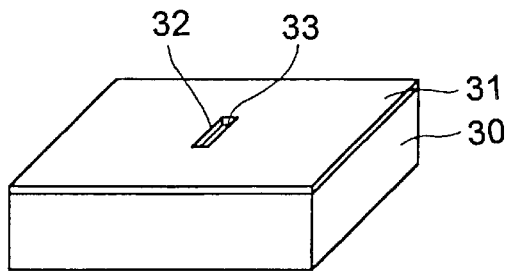
FIGS. 13A and 13B are diagrams illustrating the anodization step in the method for manufacturing an optical module of the second embodiment.
Figure 13B:
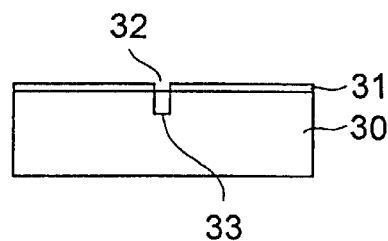

In a pit formation step, in the area where the aluminum substrate is exposed, pits 18 as shown in FIGS. 4A and 4B described earlier are formed by a micromachining method such as electron beam patterning. Thereafter through anodization in an anodization step, a photonic crystal 33 is formed as shown in FIGS. 13A and 13B.

Figure 14A:
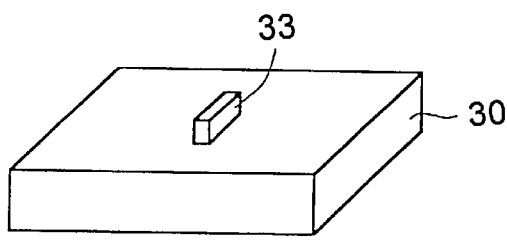
FIGS. 14A and 14B are diagrams illustrating the removal step in the method for manufacturing an optical module of the second embodiment.
Figure 14B:
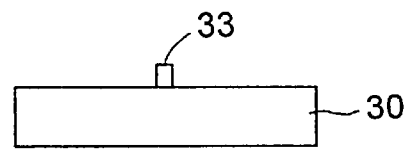

Then, the resist 31 is removed in a removal step, and an upper layer of the aluminum substrate 30 is removed by immersion in a saturated aqueous solution of $HgCl_2$ or saturated methanol solution of $Br_2$, so that only the photonic crystal 33 is left projecting from the aluminum substrate 30 as shown in FIGS. 14A and 14B.

Figure 15A:
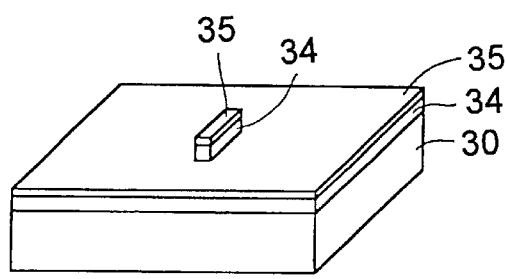
FIGS. 15A and 15B are diagrams illustrating the steps for forming a lower cladding and a core in the method for manufacturing an optical module of the second embodiment.
Figure 15B:
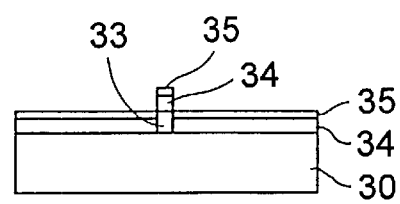

Then, as shown in FIGS. 15A and 15B, in a step for forming a lower cladding, a lower cladding layer 34 is formed by depositing fine particles of glass such as quartz by a CVD method or the like. Then, in a core formation step, a core layer 35 having a different refractive index from that of the lower cladding layer 34 is formed in the same manner. In these steps, the lower cladding layer 34 and the core layer 35 are deposited also on top of the photonic crystal 33.

Figure 16A:
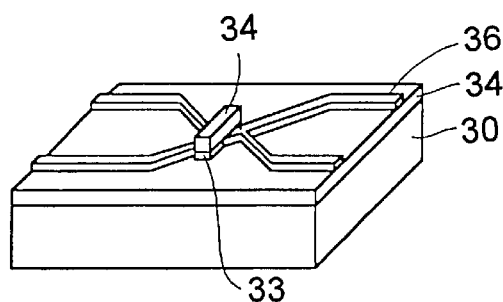
FIGS. 16A and 16B are diagrams illustrating the waveguide formation step in the method for manufacturing an optical module of the second embodiment.
Figure 16B:
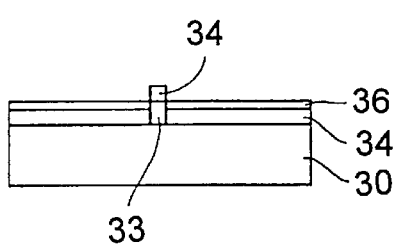
Figure 17A:
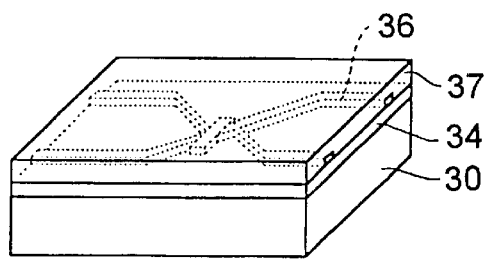
FIGS. 17A and 17B are diagrams illustrating the upper cladding formation step in the method for manufacturing an optical module of the second embodiment.
Figure 17B:
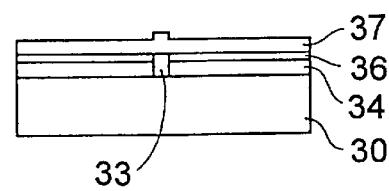

As shown in FIGS. 16A and 16B, in a waveguide formation step, the core layer 35 is patterned into a desired waveguide shape, and then the portion thereof other than is to be formed into an actual waveguide 36 is removed by RIE or the like. Here, the core layer 35 left on top of the photonic crystal 33 is also removed. Then, as shown in FIGS. 17A and 17B, in a step for forming an upper cladding, an upper cladding layer 37 is deposited further on top in the same manner as the lower cladding layer 34, and then unnecessary portions are cut off by dicing or the like. In this way, an optical module is obtained.

The lower cladding layer 34, the core layer 35, and the upper cladding layer 37 may be formed of any other material than quartz, as long as they are so formed that the refractive index of the core layer 35 forming the waveguide 36 is higher than those of the upper and lower cladding layers 34, 37.

As in the first embodiment, in this manufacturing method, when the lower cladding layer 34 is formed in FIGS. 15A and 15B, the glass particles deposited to form the lower cladding layer 34 fill the pores 15 (see FIG. 3) of the photonic crystal 33. Even then, there is a difference in refractive index between the glass particles filling the pores 15 and the alumina, and thus the obtained photonic crystal functions properly. However, when it is desirable that the difference in refractive index be made greater by filling the pores 15 with air, a step for laying a masking on the photonic crystal 33 is inserted before depositing the lower cladding layer 34 so that the glass particles are prevented from filing the pores 15.

As shown in FIGS. 16A and 16B, part of the lower cladding layer 34 remains on top of the photonic crystal 33. However, since thereafter the upper cladding layer 37 is formed further on top (FIGS. 17A and 17B), though a small projection is left on the surface, it does not affect the performance of the photonic crystal and the optical module in practical use.

Figure 18A:
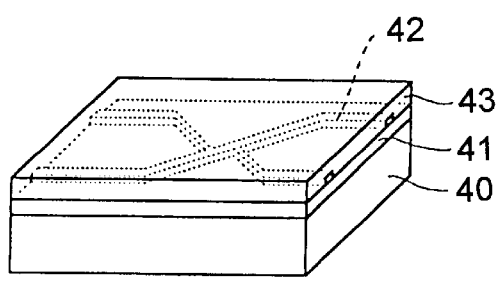
FIGS. 18A and 18B are diagrams illustrating the steps for forming a lower cladding, a core, a waveguide, and an upper cladding in the method for manufacturing an optical module of a third embodiment of the invention.
Figure 18B:
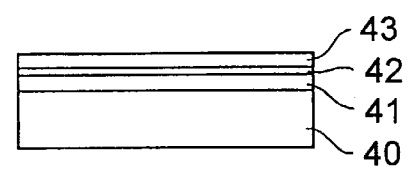

FIGS. 18A, 18B, 19A, 19B, 20A, 20B, 21A, 21B, 22A, and 22B show the method for manufacturing an optical module of a third embodiment of the invention. Of these figures, FIGS. 18A, 19A, 20A, 21A, and 22A are perspective views, and FIGS. 18B, 19B, 20B, 21B, and 22B are sectional views. First, as shown in FIGS. 18A and 18B, in a step for forming a lower cladding, a lower cladding layer 41 is formed by depositing fine particles of glass such as quartz on a conductive substrate 40 such as one made of low-resistance silicon by a CVD method or the like.

Next, in a core formation step, a core layer having a different refractive index from that of the lower cladding layer 41 is formed in the same manner. Then, in a waveguide formation step, the core layer is patterned into a desired waveguide shape, and the portion thereof other than is to be formed into an actual waveguide 42 is removed by RIE or the like. Then, in a step for forming an upper cladding layer, an upper cladding layer 43 is deposited further on top in the same manner as the lower cladding layer 41.

The lower cladding layer 41, the core layer, and the upper cladding layer 43 may be formed of any other material than quartz, as long as they are so formed that the refractive index of the core layer forming the waveguide 42 is higher than those of the upper and lower cladding layers 41, 43.

Figure 19A:
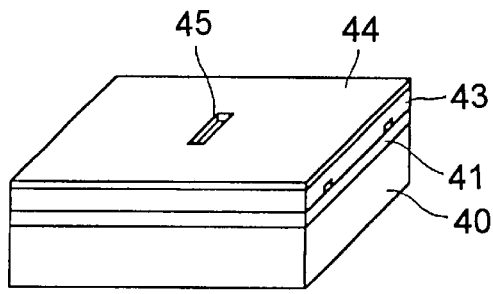
FIGS. 19A and 19B are diagrams illustrating the protective film formation step in the method for manufacturing an optical module of the third embodiment.
Figure 19B:
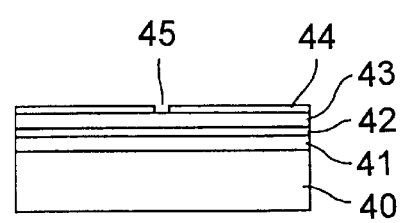
Figure 20A:
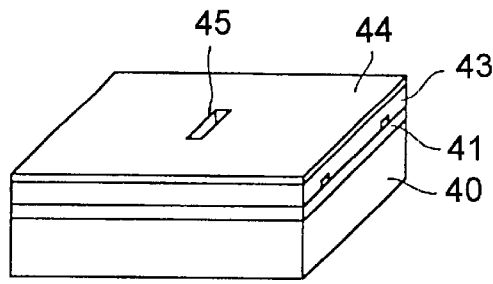
FIGS. 20A and 20B are diagrams illustrating the removal step in the method for manufacturing an optical module of the third embodiment.
Figure 20B:
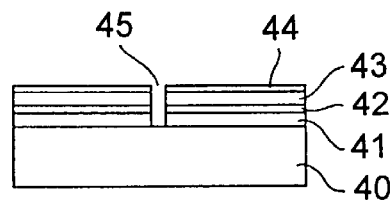

As shown in FIGS. 19A and 19B, in a protective film formation step, a resist 44 is applied to the surface of the upper cladding layer 43. In the resist 44, a window 45 is formed only where a photonic crystal is to be formed. Then, in a removal step, as shown in FIGS. 20A and 20B, portions of the upper cladding layer 43, the waveguide 42, and the lower cladding layer 41 that lay right below the window 45 are removed down to the surface of the conductive substrate 40.

Figure 21A:
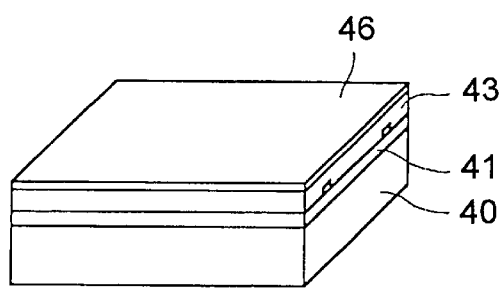
FIGS. 21A and 22B are diagrams illustrating the aluminum filling step in the method for manufacturing an optical module of the third embodiment.
Figure 21B:
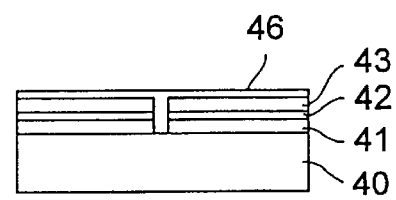

The reason for using the conductive substrate is that, in anodization, the conductive substrate 40 can be used as an electrode that provides secure electrical contact with an aluminum film described later. Then, the resist 44 is removed, and then, in an aluminum filling step, as shown in FIGS. 21A and 21B, an aluminum film 46 is deposited all over by sputtering or vacuum deposition so as to fill the area removed in the removal step with aluminum.

Figure 22A:
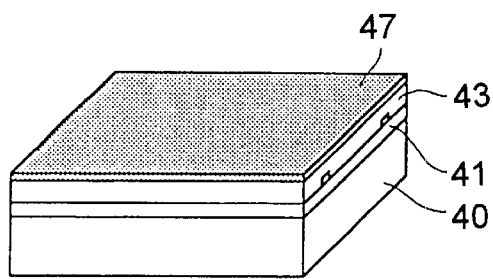
Figure 22B:
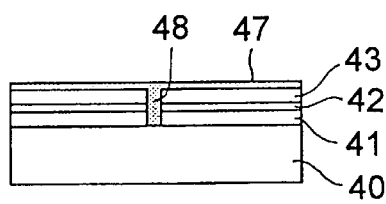

Then, pits 18 (see FIGS. 4A and 4B) are formed in the surface of the aluminum film 46 only where a photonic crystal is to be formed (the portion corresponding to the window 45 shown in FIGS. 20A and 20B) in a pit formation step by a micromachining method such as electron beam patterning. Then, through anodization in an anodization step, as shown in FIGS. 22A and 22B, the aluminum film 46 is formed into porous alumina 47, and a photonic crystal 48 is formed in the channel of the waveguide 42. Lastly, unnecessary portions are cut off by dicing or the like. In this way, an optical module is obtained.

All the optical modules produced by the manufacturing methods of the first to third embodiments have the same structure in that a photonic crystal serving as a multiplexing/demultiplexing element is integrally formed in the channel of a waveguide (FIGS. 11A, 11B, 17A, 17B, 22A, and 22B). All these manufacturing methods make it possible to manufacture an optical module in continuous manufacturing steps using photolithography as conventionally used for the manufacture of semiconductor devices.

What is claimed is:

1. A method for manufacturing an optical module, comprising:
   an aluminum film formation step for forming an aluminum film on a conductive substrate;
   a protective film formation step for forming a protective film on the aluminum film;
   an exposure step for exposing the aluminum film by removing the protective film within a predetermined area;
   an anodization step for forming a photonic crystal formed of a porous material by anodizing the aluminum film within the predetermined area;
   a removal step for making the photonic crystal project by removing the protective film and the aluminum film;
   a lower cladding formation step for forming a lower cladding layer on the substrate;
   a core formation step for forming a core layer on the lower cladding layer;
   a waveguide formation step for forming a waveguide by patterning the core layer into a predetermined shape; and
   an upper cladding formation step for forming an upper cladding layer covering the waveguide.

2. A method for manufacturing an optical module as claimed in claim 1,
   wherein a pit formation step for forming pits in a predetermined periodic pattern on the aluminum film is inserted before the anodization step.

3. A method for manufacturing an optical module as claimed in claim 2,
   wherein the pits are formed by electron beam patterning.

4. A method for manufacturing an optical module comprising:
   a protective film formation step for forming a protective film on an aluminum substrate;
   an exposure step for exposing the aluminum substrate by removing the protective film within a predetermined area;
   an anodization step for forming a photonic crystal formed of a porous material by anodizing the aluminum substrate within the predetermined area where the aluminum substrate is exposed by removing the protective film;
   a removal step for making the photonic crystal project by removing the protective film and an upper layer of the aluminum film;
   a lower cladding formation step for forming a lower cladding layer on the substrate;
   a core formation step for forming a core layer on the lower cladding layer;
   a waveguide formation step for forming a waveguide by patterning the core layer into a predetermined shape; and
   an upper cladding formation step for forming an upper cladding layer covering the waveguide.

5. A method for manufacturing an optical module as claimed in claim 4,
   wherein a pit formation step for forming pits in a predetermined periodic pattern on the aluminum substrate is inserted before the anodization step.

6. A method for manufacturing an optical module as claimed in claim 5,
   wherein the pits are formed by electron beam patterning.

7. A method for manufacturing an optical module comprising:
   a lower cladding formation step for forming a lower cladding layer on a conductive substrate;
   a core formation step for forming a core layer on the lower cladding layer;
   a waveguide formation step for forming a waveguide by patterning the core layer into a predetermined shape;
   an upper cladding formation step for forming an upper cladding layer covering the waveguide;
   a removal step for removing the upper cladding layer, the core layer, and the lower cladding layer within a predetermined area;
   an aluminum filling step for filling the predetermined area with aluminum; and
   an anodization step for forming a photonic crystal formed of a porous material by anodizing the aluminum filling in the predetermined area.

8. A method for manufacturing an optical module as claimed in claim 7,
wherein a pit formation step for forming pits in a predetermined periodic pattern on the aluminum is inserted before the anodization step.

9. A method for manufacturing an optical module as claimed in claim 8,
wherein the pits are formed by electron beam patterning.

* * * * *